3,198,202
PNEUMATIC CONTROL OF PHYSICAL
QUANTITIES
Nico Jacobus August van den Hemel, Klaproosstraat 13a,
Vlaardingen, Netherlands
Filed June 23, 1960, Ser. No. 38,183
Claims priority, application Great Britain, June 26, 1959,
22,106/59
10 Claims. (Cl. 137—85)

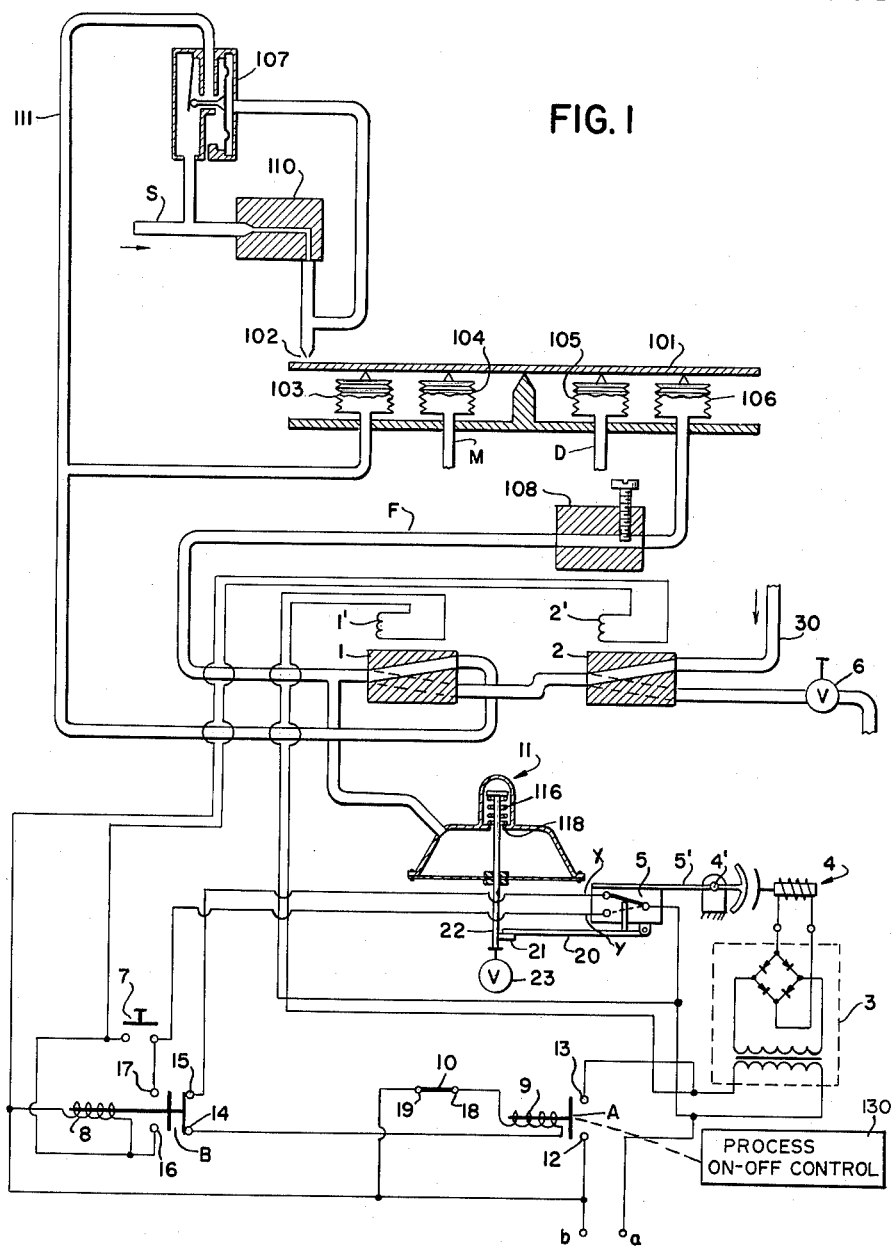

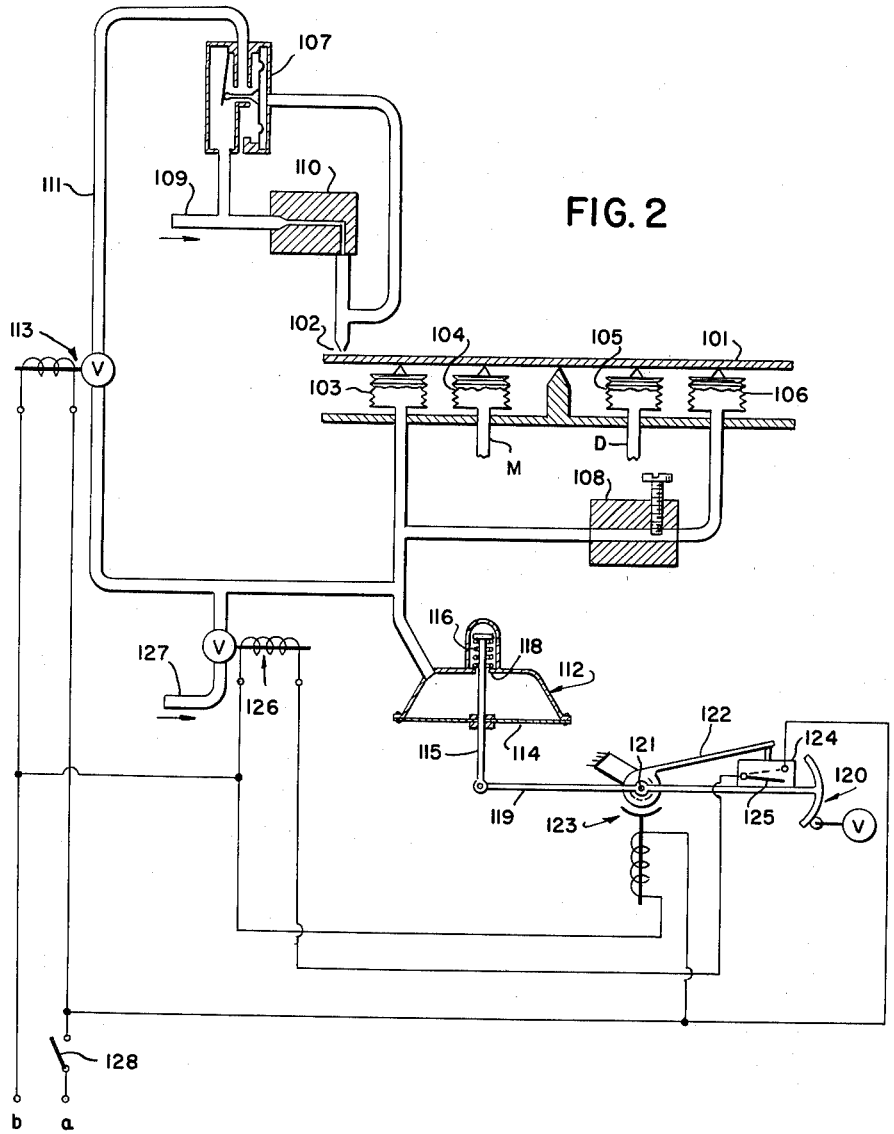

This invention relates to the control of the magnitude of physical quantities. The invention is particularly applicable to the case where the controller is a pneumatic one of the flapper-nozzle type with proportional plus reset action.

In the field of process control it is often desired to interrupt a process for a time, e.g., for cleaning or repairing purposes, and to restart it at the same setting as when it was interrupted. However, when pneumatic controllers of the flapper-nozzle type with proportional plus reset action are used, interruption of the process for a period of time easily disturbs the setting of the controller.

It would be possible to maintain the last pressure in the proportional plus reset part of the controller and in the part which contains the control member by means of valves which would automatically block the respective air connections when the process is interrupted. However, this method would only be applicable if the process were to be interrupted for a very short time, as air leakage would occur during a longer period of inactivity.

It is an object of the present invention to provide a method and apparatus for use in controlling a process variable whereby the process can be restarted after an interruption with the process variable having substantially the same setting as when the interruption occurred.

According to one aspect of the present invention there is provided a pneumatic controller for controlling a process variable, the controller including a control member for regulating the magnitude of the process variable, a memorizing device for memorizing the last setting of the control member whenever the process is interrupted, and establishing means for establishing the control member at the memorized setting before the process is continued.

The pneumatic controller can have proportional plus reset action.

The establishing means can comprise a first means for moving the control member back to the memorized setting when it is desired to continue the process.

The memorizing device can include a switch which is arranged to be actuated by the return of the control member to said memorized setting, this actuation being necessary before the process can continue.

The establishing means can include a second means for moving the control member to an extreme setting immediately after the said last setting has been memorized. This second means can comprise a valve for connecting the control member to a source of pressure higher than that at which the control member normally operates and said first means can then comprise a valve for connecting the control member to a source of pressure lower than that at which the control member normally operates.

The establishing means can comprise a detecting device for detecting movement of the control member away from the memorized setting, and a correcting device for restoring the control member to the memorized setting each time the detecting device detects such movement so that the control member can be retained at the memorized setting until the process is continued. The correcting device can be arranged to restore the control member to the memorized setting by correcting any decreases in pressure in the control member from the pressure in the control member at the memorized setting.

The memorizing device can comprise a member arranged to follow-up the movement of the control member, and means for fixing this follow-up member in its last position when the process is interrupted. The memorizing device can include a switch which is arranged to be actuated when the follow-up member ceases to follow the movement of the control member.

According to a particular aspect of the present invention there is provided a pneumatic controller with proportional plus reset action for controlling a process variable, the controller including a control member for regulating the magnitude of the process variable, a follow-up member for following the movement of the control member, an electro magnetic means for fixing the last position of the follow-up member when the process is interrupted and so memorizing the setting of the control member, a valve for connecting the control member to a source of high pressure when the process is interrupted to move the control member to an extreme setting, a microswitch arranged to be actuated when the follow-up member ceases to follow the control member, a valve for venting the pressure in the control member to atmosphere, the arrangement being such that the pressure in the control member is vented to atmosphere when it is desired to continue the process so moving the control member away from said extreme setting until it reaches the memorized setting whereupon the control member reactuates the micro-switch to enable the process to be restarted.

According to another particular aspect of the present invention there is provided a pneumatic controller with proportional plus reset action for controlling a process variable, the controller including a control member for regulating the magnitude of the process variable, a follow-up member for following the movement of the control member, means for fixing the last position of the follow-up member when the process is interrupted so memorizing the setting of the control member, a first valve for shutting off the pressure in the control member and proportional plus reset part of the controller from the rest of the controller when the process is interrupted, a second valve for connecting the control member and proportional plus reset part of the controller to a source of higher pressure, and a micro-switch arranged to be actuated by movement of the control member away from said memorized setting to operate said second valve to connect the shut-off part of the controller to said source of higher pressure and so return the control member to said memorized setting, the arrangement being such that each time said higher pressure returns the control member to said memorized setting the micro-switch is reactuated to disconnect said source of higher pressure.

According to yet another aspect of the present invention there is provided a method of controlling a process variable with a control member operated by a pneumatic controller with proportional plus reset action in which the last setting of the control member is automatically memorized when the process is interrupted, and the control member is established at said memorized setting before the process is restarted.

When the process is interrupted, the control member can be moved to an extreme setting and when it is desired to restart the process the control member can be moved away from said extreme setting until it reaches said memorized setting whereupon the process can be restarted.

Alternatively, during said interruption, whenever the control member moves away from said memorized setting, the control member can be connected to a source of extreme pressure tending to return the control member to said memorized setting, said source of extreme pressure being disconnected when the control member reoccupies said memorized setting.

Two embodiments of the invention will now be particularly described by way of example with reference to the accompanying diagrammatic drawings, in which:

FIG. 1 shows a pneumatic controller; and

FIG. 2 shows a vertical view, partly in section of another pneumatic controller.

The embodiment shown in FIG. 1 will first be described. In this figure the upper half is a schematic diagram of the pneumatic part of the controller, and the lower half is the electric circuit of the controller. The controller is of the flapper-nozzle type utilizing a floating disc 101 whose action is described in detail in connection with the apparatus of FIG. 2, and can be used for maintaining a constant weight ratio between two powders which are being mixed. The apparatus for mixing the two powders, which forms no part of this invention, is not shown in the figure. Part of this apparatus determines the respective weights of the powders and converts these weights into pressures, one of which is fed through the conduit D to the desired value bellows 105 or desired value input of the flapper nozzle system and the other through the conduit M to the measured value bellows 104 or measured value input of the flapper nozzle system. A deviation in the pressure in either of the conduits D and M causes a corresponding change in output pressure in a line 111 from the flapper nozzle system that is coupled to a proportional bellows 103 and through a valve 1 to a control member 11 and to a line F that is coupled to a reset bellows 106 through an adjustable or variable restriction 108, the pressure being supplied to the system via an input line S. Such a change in pressure results in the displacement of a movable rod 22 which is actuated by the control member 11 and which is coupled to a regulating device or adjustable valve 23 in the supply pipe of one of the powders (not shown) to bring about a corrective action. Referring to the lower half of FIG. 1, $a$, $b$ are electrical leads that are coupled to a source of electrical power (not shown). A relay A interrupts and restarts the process since it is coupled to a process on-off control 130 that controls the operation of the process. Typically, the control 130 may control the supplying of electrical power to the process apparatus. This relay A is actuated by a coil 9.

In the normal position of the valve 1 a connection is provided between the flapper-nozzle system line 111 and the reset bellows line F and control member 11. When the operating coil 1' of the valve 1 is energized, the valve 1 connects the reset bellows line F to a second electromagnetically operated valve 2, thereby disconnecting the flapper-nozzle system line 111 from the reset bellows line F and corrective control member 11. The operating coil 1' of the valve 1 is in an electric circuit which includes a transformer and rectifier 3, an electro-magnetic coupling 4, and a micro-switch 5. A pivoted operating arm 20 of the micro-switch rests upon a small projection 21 of the movable rod 22 of the control member 11. The micro-switch 5 is carried on an arm 5' which can pivot about a center point 4'. The memorizing device comprises the transformer and rectifier 3, coupling 4, and switch 5, insofar as by their co-operation the last position of the movable rod 22 of the control member 11 is detected.

The electro-magnetically operated valve 2 is normally connected to a high pressure air supply 30. When its operating coil 2' is energized the valve 2 is connected to a stopcock 6 which when open communicates with the atmosphere. This stopcock is adjustable for regulating the rate of the drop of pressure in the reset bellows line F and control member 11 when these are connected to the atmosphere through the valves 1 and 2 and the stopcock 6. The coil 2' is in a circuit which includes a coil 8 which actuates a relay B.

In FIG. 1 the arrangement is sketched in a position corresponding to the process working. The term "process working" means that a process which is controlled by the pneumatic controller is in operation. The switches indicated in the lower portion of FIG. 1 are thus shown in the positions they occupy when the process is in operation. During this time, the switch 10 connects points 18 and 19 so that via these points, coil 9, points 14 and 15, and a lead $x$ of the switch 5, a connection is made between the two phase leads $a$ and $b$. The relay A is actuated by energized coil 9, thereby disconnecting the points 12 and 13 and rendering the process on-off control 130 in the "on" or process working mode of operation. The whole micro-switch 5, connecting the phase lead $a$ to the lead $x$ follows the movements of the rod 22 of the control member 11 by pivoting about 4' as long as relay B is in the de-actuated position shown in FIG. 1. Also, the valve 2 remains disconnected from the reset bellows line F and control member 11.

In order to interrupt the process, the connection between points 18 and 19 is broken, and consequently the connection between the two phase leads $a$ and $b$ via these points, coil 9, points 14 and 15, and the lead $x$ of the switch 5 is also broken. Relay A is thereby de-actuated and moves to connect points 12 and 13 as well as to render the process on-off control 130 in the "off" mode of operation, thereby interrupting the process. The circuit containing the transformer and rectifier 3 and the operating coil 1' of the valve 1 is closed between phase leads $a$ and $b$. This energizes the coupling 4 to lock the micro-switch carrying arm 5' and so fix or memorize the last operating location of the micro-switch arm 5'. Also, the valve 1 is switched into the position indicated by the dotted line and connects the reset bellows line F and control member 11 via valve 2 to the high pressure air supply 30. The pressure in the reset bellows line F and control member 11 is thus raised to the maximum pressure in the system. Owing to this, the movable rod 22 of the control member 11 is moved downwards to an extreme setting which, because of the fixed location of the micro-switch, causes the micro-switch arm 20 to be switched into a position coupling a lead $y$ to the phase lead $a$, as indicated by a dotted line. The rod 22 remains in this extreme position, i.e., in a reference or "process not working" position, until the process is restarted. To restart the process points 18 and 19 are again connected and the starter button 7 is pushed in. This brings about a connection between the two phase leads $a$ and $b$ via $y$, starter button 7 and coils 2' and 8, so that relay B is actuated. This causes another connection to be made between phase leads $a$ and $b$ via $y$, points 17 and 16 and coils 2' and 8, thereby eliminating the need to continue depressing the starter button 7. The points 14 and 15 are disconnected. Coil 2' is energized and switches the valve 2 into the position indicated by the dotted line. The pressure in the control member 11 now drops via the adjustable stopcock 6. When the pressure in the member 11 has returned to its last value before the interruption, the rod 22 of the control member 11 returns to its last setting, as memorized by the carrying arm 5' of the micro-switch, locked in its last operating position by the coupling 4, and switches the micro-switch operating arm 20 to couple together the phase lead $a$ and the lead $x$, thereby de-energizing coils 8 and 2'. Relay B is thereupon de-actuated, again connecting the phase leads $a$ and $b$ through the lead $x$, points 15 and 14, coil 9, and points 18 and 19. Thus, relay A is actuated to disconnect the terminals 12 and 13 and restart the process by placing the process on-off control 130 in the "on" or process working mode of operation. The connection between points 12 and 13 is broken, so that the coupling 4 is de-energized and the micro-switch carrying arm 5' is set free to follow the movement of the rod 22 again. Valves 1 and 2 are also moved into their process working positions shown in full lines in FIG. 1.

The embodiment shown in FIG. 2 will now be described. This controller is a pneumatic controller with proportional plus reset action and comprises a floating disc 101 and a nozzle 102, which form a flapper-nozzle system. A proportional bellows 103, a measured value bellows 104 that receives pressure from a conduit M correesponding to M of FIG. 1, a desired value bellows 105 that receives pressure from a conduit D corresponding to D of FIG. 1, and a reset bellows 106 in action exert a thrust to tip the disc 101. Their net effect establishes the ultimate position of the flapper 101 relative to the nozzle 102, and the resulting back pressure at this nozzle is amplified through a relay 107 and a line 111 to rebalance the disc 101. This back pressure is the controller output which is supplied to a control member 112, and is proportional to the difference between the pressure in the desired value bellows 105 and the pressure in the measure value bellows 104. The reset bellows 106 is connected to the output conduit leading to the control member 112 through a variable restriction 108. If there is a deviation between the desired and measured value of the process variable being controlled, the floating disc 101 will continue to change the output pressure in the line 111 until the movable rod 115 of the control member 112 assumes the position necessary to maintain the process variable at the desired value, that is until the pressure in the measured value bellows 104 equals the pressure in the desired value bellows 105. The compressed air is supplied through conduit 109 and resistance 110 to the nozzle 102. Air can flow via the relay 107, which amplifies the back pressure, and conduit 111 to the control member 112, to the proportional bellows 103, and through the restriction 108 to the reset bellows 106. A solenoid operated valve 113 is automatically actuated at the moment of stopping the control process when a switch 28 is closed coupling the solenoid to a pair of leads *a* and *b* that are in turn coupled to a source of electrical power (not shown), thereby to shut off the air supply to the control member 112.

The control member 112 comprises a diaphragm 114 secured at its periphery to the housing of the member, a rod 115 passing through and secured to the diaphragm, and a spring 116 compressed between an enlarged upper end of the rod 115 and a part 118 of the housing. The rod 115 and diaphragm 114 are urged upwardly by the spring 116. If the pressure in the member 112 changes as a consequence of a deviation between the desired and measured values, the diaphragm 114 moves upwards or downwards, which movements are followed by the rod 115. This rod is pivotally connected to the valve actuating arm 119 of a valve 120 that controls the process variable, and the valve actuating arm 119 can turn about a fixed pivot 121. A movable arm member 122 is connected to the valve actuating arm 119 in such a manner that it follows freely the rotary movements of the valve actuating arm 119. A clutch 123 in the form of an electromagnetic coupling or brake member is provided coaxially with the pivot 121. This clutch automatically fixes the movable follow-up member 122 relative to the frame of the controller at the moment the process is interrupted, i.e., when the switch 128 is closed. The switch 128 may be coupled to a process on-off control similar to the control 130 of FIG. 1.

A micro-switch 124 is carried by the valve actuating arm 119 of the valve. The contact 125 of the switch 124 is normally pushed in by the weight of the movable follow-up member 122 while the process is working. A solenoid operated valve 126 is provided in an additional compressed air supply 127 to the part of the controller which is shut off by the valve 113 at the moment of stopping, this valve 126 being closed or opened as a result of the signals given by the micro-switch 124.

In use, at the moment of stopping the control process, the movable follow-up member 122 is automatically fixed relative to the frame of the controller, while at the same time the solenoid operated valve 113 is automatically closed so shutting off the main air supply to the control member 112 and the proportional and reset bellows. If now air leaks away from the control member 112 and the pressure therein drops the rod 115 moves upward, the valve actuating arm 119 turns clockwise about the point 121, and consequently the micro-switch 124 moves downwards. As the follow-up member 122 is fixed it can no longer follow the movements of the valve actuating arm 119. As a result, the contact 125 of the micro-switch is released. This actuates the solenoid operated valve 126 which opens the additional air supply 127 to the control member 112. When the last pressure in the control member at the moment of interruption is re-established, and thus also when the valve actuating arm 119 has returned to its memorized position, the still fixed follow-up member 112 again pushes in the contact 125 of the micro-switch and the solenoid operated valve 126 is de-actuated to shut off the additional air supply to the control member. When the process is started again, the clutch 123 is released and allows the follow-up arm 122 again to follow the movements of the valve actuating arm 119. Thus, the micro-switch 124 constitutes the detecting device and the solenoid operated valve 126 together with the additional air supply 127 constitute the correcting device.

In this way, the condition at the moment of stopping is maintained until the process is restarted after the interruption.

What is claimed is:

1. In a pneumatic controller for controlling a process variable having a control member for regulating the magnitude of the process variable and a control means for starting and stopping the process, the combination comprising a memorising device for memorising the last setting of the control member whenever the process is interrupted, and establishing means coupled to the control member and the control means for establishing the control member at the memorised setting before the process is continued.

2. In a pneumatic controller for controlling a process variable having a control member for regulating the magnitude of the process variable and a control means for starting and stopping the process, the combination comprising a memorising device for memorising the last setting of the control member whenever the process is interrupted, means for moving the control member back to said memorised setting when it is desired to continue the process, and a switch which is arranged to be actuated by the return of the control member to said memorised setting, the switch being coupled to the control means to start the process when the switch is actuated.

3. In a pneumatic controller for controlling a process variable having a control member for regulating the magnitude of the process variable and a control means for starting and stopping the process, the combination comprising a memorising device for memorising the last setting of the control member whenever the process is interrupted, a first means for moving the control member to an extreme setting immediately after the said last setting has been memorised, a second means for moving the control member back to said memorised setting when it is desired to continue the process, and a switch which is arranged to be actuated by the return of the control member to said memorised setting, the switch being coupled to the control means to start the process when the switch is actuated.

4. In a pneumatic controller for controlling a process variable having a control member for regulating the magnitude of the process variable and a control means for starting and stopping the process, the combination comprising a memorising device for memorising the last setting of the control member whenever the process is interrupted, a first valve for connecting the control member to a source of high pressure, means for operating said first valve immediately after the said last setting has been memorised in order to move the control member to an extreme setting, a second valve for connecting the control member to a source of low pressure, means for operating said second valve when it is desired to continue the process in order to move the control member back to said memorised setting, and a switch which is arranged to be actuated by the return of the control member to said memorised setting, the switch being coupled to the control means to start the process when the switch is actuated.

5. In a pneumatic controller for controlling a process variable having a control member for regulating the magnitude of the process variable, the combination comprising a memorising device for memorising the last setting of the control member whenever the process is interrupted, a detecting device for detecting movement of the control member away from said memorised setting, and a correcting device for restoring the control member to said memorised setting each time the detecting device detects such movement so that the control member can be retained at the memorised setting until the process is continued.

6. In a pneumatic controller for controlling a process variable having a control member for regulating the magnitude of the process variable, the combination comprising a memorising device for memorising the last setting of the control member whenever the process is interrupted, a detecting device for detecting movement of the control member away from said memorised setting due to a decrease in pressure in the control member, a correcting means for connecting the control member to a source of higher pressure each time said detecting device detects such movement in order to return the control member to said memorised setting, the correcting means being arranged to disconnect the control member from said source of higher pressure when the control member returns to said memorised setting so that the control member can be retained at the memorised setting until the process is continued.

7. In a pneumatic controller for controlling a process variable having a control member for regulating the magnitude of the process variable and a control means for starting and stopping the process, the combination comprising a member arranged to follow the movement of the control member, means for fixing this follow member in its last position whenever the process is interrupted so memorising the last setting of the control member, and means coupled to the control member and the control means for establishing the control member at said memorised setting before the control means may be actuated to restart the process.

8. In a pneumatic controller for controlling a process variable having a control member for regulating the magnitude of the process variable and a control means for starting and stopping the process, the combination comprising a follow member arranged to follow the movement of the control member, means for fixing this follow member in its last position when the process is interrupted so memorising the last setting of the control member, a switch which is arranged to be actuated when the control member moves away from the fixed follow member, and means for establishing the control member at said memorised setting to deactuate said switch before the process is continued, the switch being coupled to the control means to start the process when the switch is deactuated.

9. In a pneumatic controller for controlling a process variable having a control member for regulating the magnitude of the process variable and a control means for starting and stopping the process, the combination comprising a follow member for following the movement of the control member, an electro-magnetic means for fixing the last position of the follow member when the process is interrupted and so memorising the setting of the control member, a valve for connecting the control member to a source of high pressure when the process is interrupted to move the control member to an extreme setting, a micro-switch coupled to the control means and arranged to be actuated when the follow member ceases to follow the control member, a valve for venting the pressure in the control member to atmosphere, the arrangement being such that the pressure in the control member is vented to atmosphere when it is desired to continue the process so moving the control member away from said extreme setting until it reaches the memorised setting whereupon the control member deactuates the micro-switch coupled to the control means to enable the process to be restarted.

10. In a pneumatic controller with proportional plus reset action for controlling a process variable having a control member for regulating the magnitude of the process variable, the combination comprising a follow member for following the movement of the control member, means for fixing the last position of the follow member when the process is interrupted so memorising the setting of the control member, a first valve for shutting off the pressure in the control member and proportional plus reset part of the controller from the rest of the controller when the process is interrupted, a second valve for connecting the control member and proportional plus reset part of the controller to a source of higher pressure, and a micro-switch arranged to be actuated by movement of the control member away from said memorised setting to operate said second valve to connect the shut-off part of the controller to said source of higher pressure and so return the control member to said memorised setting, the arrangement being such that each time said higher pressure returns the control member to said memorised setting the micro-switch is reactuated to disconnect said source of higher pressure.

References Cited by the Examiner

UNITED STATES PATENTS

| | | | |
|---|---|---|---|
| 2,010,420 | 8/35 | Simmen | 121—47 XR |
| 2,498,483 | 2/50 | Campbell | 121—38 |
| 2,556,955 | 6/51 | Ziegler | 99—344 XR |
| 2,692,581 | 10/54 | Ziebolz | 121—47 XR |
| 2,825,306 | 3/58 | Buri | 251—26 XR |

WILLIAM F. O'DEA, *Primary Examiner.*

KARL J. ALBRECHT, ISADOR WEIL, *Examiners.*